United States Patent [19]
Cho et al.

[11] Patent Number: 6,083,643
[45] Date of Patent: Jul. 4, 2000

[54] ACTIVE MATERIAL FOR A CATHODE OF LITHIUM ION BATTERY AND A METHOD FOR PREPARING THE SAME

[75] Inventors: Jae-phil Cho; Geun-bae Kim, both of Suwon-si, Rep. of Korea

[73] Assignee: Samsung Display Devices Co., Inc., Kyungki-do, Rep. of Korea

[21] Appl. No.: 08/976,791

[22] Filed: Nov. 24, 1997

[30] Foreign Application Priority Data

Jun. 30, 1997 [KR] Rep. of Korea ............... 97-29439

[51] Int. Cl.⁷ .............. H01M 4/50; C01G 45/12
[52] U.S. Cl. .................. 429/224; 429/231.3; 429/223; 423/599
[58] Field of Search ................. 429/224, 223, 429/231.95, 231.3; 423/599

[56] References Cited

U.S. PATENT DOCUMENTS

| | | | |
|---|---|---|---|
| 5,135,732 | 8/1992 | Barboux et al. | 423/593 |
| 5,370,948 | 12/1994 | Hasegawa et al. | 429/223 |
| 5,425,932 | 6/1995 | Tarascon | 423/599 |
| 5,565,688 | 10/1996 | Hayashi . | |
| 5,567,401 | 10/1996 | Doddapaneni et al. | 423/179.5 |
| 5,742,070 | 4/1998 | Hayashi et al. | 252/182.1 |
| 5,762,900 | 6/1998 | Kweon et al. | 423/599 |
| 5,807,646 | 9/1998 | Iwata et al. | 429/224 |
| 5,866,279 | 2/1999 | Wada et al. | 429/224 |

FOREIGN PATENT DOCUMENTS

| | | |
|---|---|---|
| 0712173 | 5/1996 | European Pat. Off. . |
| 2276155 | 9/1994 | United Kingdom . |
| 2276156 | 9/1994 | United Kingdom . |

OTHER PUBLICATIONS

J. Electrochem. Soc. (vol. 141, No.6, pp 1421–1431, Jun. 1994).

*Primary Examiner*—J. O'Malley
*Attorney, Agent, or Firm*—Christie, Parker & Hale, LLP

[57] ABSTRACT

A process for preparing an active material for a cathode of a lithium ion battery comprising the steps of: dissolving lithium hydroxide, manganese acetate as starting materials into water to form a solution; adding a chelating agent into the solution; producing gel or liquid phase by evaporating the solution; and producing a powder by raising temperature at the rate of 5~20 ° C./min, combusting and calcinating the gel or liquid phase at 300~400 ° C. during 2~3 hours is disclosed.

8 Claims, 6 Drawing Sheets

ACTIVE MATERIAL FOR A CATHODE OF LITHIUM ION BATTERY AND A METHOD FOR PREPARING THE SAME

CROSS-REFERENCE TO RELATED APPLICATION

This application claims priority of Korean Patent Application No. 97-29439, filed Jun. 30, 1997.

FIELD OF THE INVENTION

The present invention relates to an active material for a cathode of lithium ion battery and a method for preparing the same, and more particularly to a process for preparing an active material for a cathode of a lithium ion battery having high capacity and stability while charging and discharging the battery.

BACKGROUND OF THE INVENTION

Recently, portable electronic equipment, such as cameras, camcorders, portable CD players, portable radio/cassette players, notebook computers, pagers and cellular phones, are widely used. To meet the power needs of such devices, a battery having a higher capacity and a longer life span is needed, and it is economically desirable to reduce the production cost of the battery.

In general, a battery is a device that converts chemical energy into electrical energy by using the contact potential difference between suitable materials, and many kinds of batteries are now available. Batteries are technologically classified as primary batteries, secondary batteries, fuel batteries, or solar batteries. A primary battery, such as a Mn battery, Alkaline battery, Hg battery or oxidized Ag battery, is disposable and cannot be recharged after use. In contrast, a secondary battery is rechargeable after use and can be used repeatedly. Examples of a secondary battery are a lead storage battery, a low voltage Ni/MH battery (metal hydride is used as cathode active material), a sealed type Ni-Cd battery and a Li-based secondary battery, such as a Li metal battery, lithium ion battery (LIB), or lithium polymer battery (LPB). A primary battery has a low capacity and short life span, and may cause environmental pollution because it is not reusable. On the other hand, a secondary battery has several advantages over a primary battery. First, a secondary battery has a longer life span and produces less waste, thereby causing less environmental pollution. Second, a secondary battery has better performance and efficiency than a primary battery because the average voltage of a secondary battery is significantly greater than that of a primary battery. A fuel battery converts heat of combusting into electrical energy, and a solar battery converts light energy into electrical energy.

Materials that are currently used or can be used as the cathode material of a Li-based secondary battery include transition metal oxides such as $LiCoO_2$, $LiNiO_2$, $LiMn_2O_4$, and oxides such as $LiM_xCo_{1-x}O_2$ (M=Ni, Co, Fe, Mn, and Cr). Research for these Li secondary batteries has been vigorously pursued. Recently, a Li ion secondary battery manufactured by Sony Energytec company and Moli Energy Company uses a carbon material as an anode active component, and uses $LiCoO_2$ and $LiMn_2O_4$ as a cathode active component. They used PC (propylene carbonate), EC (ethylene carbonate), DEC (diethyl carbonate), DMC (dimethyl carbonate), $LiBF_4$ and/or $LiPF_6$ as an electrolyte.

However, the capacities of the currently used cathode active materials, such as $LiNiO_2$ or $LiCoO_2$, are relatively low (100~200 mAh/g) compared to theoretical capacity (372 mAh/g) of the anode active material ($Li_1C_6$), and only 40–50% of the theoretical capacity is available with the current technology level. Therefore, it is desireable to improve the prior cathode active material so that the theoretical capacity of the cathode can be fully used and to prepare a new cathode active material that has a higher capacity.

In addition, since the cobalt in $LiCoO_2$ that is widely used as a cathode active material in a Li secondary battery is twice as expensive as nickel and four times as expensive as manganese and detrimental to the health, an alternative to cobalt is required.

Recently, the use of $LiMn_2O_4$ as a cathode active material of a Li secondary battery has been researched, especially a process for preparing $LiMn_2O_4$, since $LiMn_2O_4$ has advantages in cost, charge and discharge characteristics, stability of electrolyte and excellent reversibility.

The cathode active material $LiMn_2O_4$ is conventionally prepared by the solid phase reaction of $Li_2CO_3$ and $MnO_2$. This method includes the steps of ball milling the material powder, sintering the powder for 24 hours at a temperature of 700 to 800° C., and repeating the process of ball milling and sintering the powder 2 to 3 times. The active material prepared by the solid phase reaction method shows continuous stability during charge-discharge; however, a large quantity of contaminants are mixed into the active material in the ball milling stage of the raw materials, thereby making it difficult to obtain a homogeneous phase. In addition, since non homogeneous reactions occur more easily, it is difficult to control the size of the powder. Furthermore, high temperature and a long process time are needed for the method. Moreover, the initial capacity of the battery having the $LiMn_2O_4$ prepared in this way is low.

According to *J. Electrochem. Soc.* (Vol. 141, No. 6, pp 1421–1431) and U.S. Pat. No. 5,425,932, $LiMn_2O_4$ was prepared by sintering $LiCO_3$ or $LiNO_3$ and $MnO_3$ during 24 hours at a temperature of 800° C., annealing, balling the sintered material and repeating this cycle twice. The $LiMn_2O_4$ prepared by this method shows an initial capacity of about 110 mAh/g while charging-discharging the battery at 3 to 4.5V.

In U.S. Pat. No. 5,135,732 by Barboux et al., $LiMnO_4$ is prepared by the sol-gel method. In this method, a spinel powder of $LiMnO_4$ was prepared by reacting the lithium hydroxide and manganese and annealing the product at a temperature of 200 to 600° C. In the reaction, $NH_4OH$ is used as a precipitation agent.

The disadvantage of this method is that the initial capacity is lowered because powder is prepared at low temperature. Also, after adding ammonium hydroxide, the powder deposited at pH 7 is very unstable and easily decomposed during the drying process. Thus, an inert gas atmosphere is absolutely needed in the drying process.

SUMMARY OF THE INVENTION

It is an object of the present invention to provide a process for preparing a cathode active material for a lithium ion battery, and the process can be completed in short time, does not need to use ammonia, and produces a stable deposit phase compared to the solid phase reaction method. The active material prepared by the process has high capacity during the charge-discharge reaction. To achieve the above objects, the present invention provides a process for preparing a cathode active material for a lithium ion battery comprising the steps of dissolving lithium hydroxide and manganese acetate as starting materials in water to form a solution, adding a chelating agent into the solution, producing a gel or liquid phase by evaporating the solution, and producing a powder by raising the temperature at a rate of about 5 to about 20° C./min and combusting and calcinating the gel or liquid at about 300 to about 400° C. for about 2 to about 3 hours.

Additional objects, advantages and novel features of the invention will be set forth in part in the description which follows, and in part will become apparent to those skilled in the art upon examination of the following or may be learned by practice of the invention. The object and advantages of the invention may be realized and attained by means of the instrumentalities and combinations particular pointed out in the appended claims.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not as restrictive.

DETAILED DESCRIPTION

The present invention provides a process for preparing a cathode active material for a lithium ion battery comprising the steps of dissolving lithium hydroxide and manganese acetate as starting materials in water to form a solution, adding a chelating agent into the solution, producing a gel or liquid phase by evaporating the solution, and producing a powder by raising the temperature at the rate of about 5 to about 20° C./min and combusting and calcinating the gel or liquid at about 300 to about 400° C. for about 2 to about 3 hours.

Preferably, the process further comprises the steps of sintering the powder at about 700 to about 850° C. for about 4 to about 6 hours and slowly cooling the powder to room temperature at the rate of about 0.1 to about 2° C./min after the step of combusting and calcinating.

Preferably, the amount of the lithium hydroxide is in the range of 0.95 mole to 1.07 mole, the amount of the manganese acetate is in the range of 1.93 mole to 2.05 mole, and the amount of the chelating agent is in the range of 0.5 mole to 1 mole.

Preferably, the chelating agent is selected from the group consisting of glycine, citric acid and oxalic acid.

Preferably, the cathode active material for the lithium ion battery is $Li_xMn_yO_4$ powder, wherein x ranges from 0.95 to 1.07 and y ranges from 1.93 to 2.05.

Preferably, the starting materials further comprise a stabilizer, the amount of the lithium hydroxide is in the range of 0.95 mole to 1.07 mole, the amount of the manganese acetate is in the range of 1.93 mole to 2.05 mole, the amount of the chelating agent is in the range of 0.5 mole to 1 mole, and the amount of the stabilizer is in the range of 0.01 mole to 0.05 mole. Preferably, the stabilizer is selected from the group consisting of nickel acetate, cobalt acetate and tin acetate.

Preferably, the cathode active material for the lithium ion battery is $Li_xMn_{2-y}M_yO_4$ powder, wherein x ranges from 1 to 1.07, and y ranges from 0 to 0.05, and M is selected from the group consisting of Ni, Co, and Sn.

The present invention also provides a cathode active material for a lithium ion battery prepared by above-described method.

Preferably, the Braunauer Emmett Teller (BET) surface area of the cathode active material ranges from 3 $m^2/g$ to 5.2 $m^2/g$ and the average diameter of the material is less than 1 $\mu m$. Preferably, the cathode active material has a spinel phase.

In the present invention, $Li_xMn_2O_4$ is prepared by using $LiOH.H_2O$ and manganese acetate $[(CH_3CO_2)_3Mn.4H_2O]$ as starting raw materials, nickel, cobalt, and/or tin acetate as a stabilizer, and glycine, citric acid and/or oxalic acid as a chelating agent. A method for synthesizing $Li_xMn_{2-y}M_yO_4$ powder having a perfect spinel phase involves first dissolving $LiOH.H_2O$ and manganese acetate and nickel, cobalt or tin acetate in distilled water at a predetermined mole ratio, then adding glycine, citric acid or oxalic acid. Then, after evaporating the water at a temperature ranging from 80 to 100° C. to cause the solution to form a gel or liquid state, a precursor is formed by combusting or calcinating the gel or liquid state solution at a temperature ranging from 300 to 400° C., and then $Li_xMn_{2-y}M_yO_4$ powder is formed by heat treatment and sintering the precursor for about 4 to about 6 hours at a temperature of 800° C. In the present invention, the time for the heat treatment is reduced compared to the conventional solid phase reaction method. Also, according to the results of a charge-discharge experiment, the initial capacity of the cathode active material is more than about 125 to about 131 mAh/g, and the charge-discharge character is stable.

According to the method described in U.S. Pat. No. 5,135,732, it is difficult to obtain a stable deposit phase at a low temperature; but in the present invention, this problem is solved by using citric acid or oxalic acid as a chelating agent, and ammonia is not required to produce the active material. Moreover, a spinel phase having the capacity of over 125 mAh/g is produced by performing the sintering process at 800° C., and the spinel structure is stabilized by the cobalt, nickel, or tin acetate, and thus the stability of the capacity during charge-discharge can be maintained.

EXAMPLE 1

Figure 1:
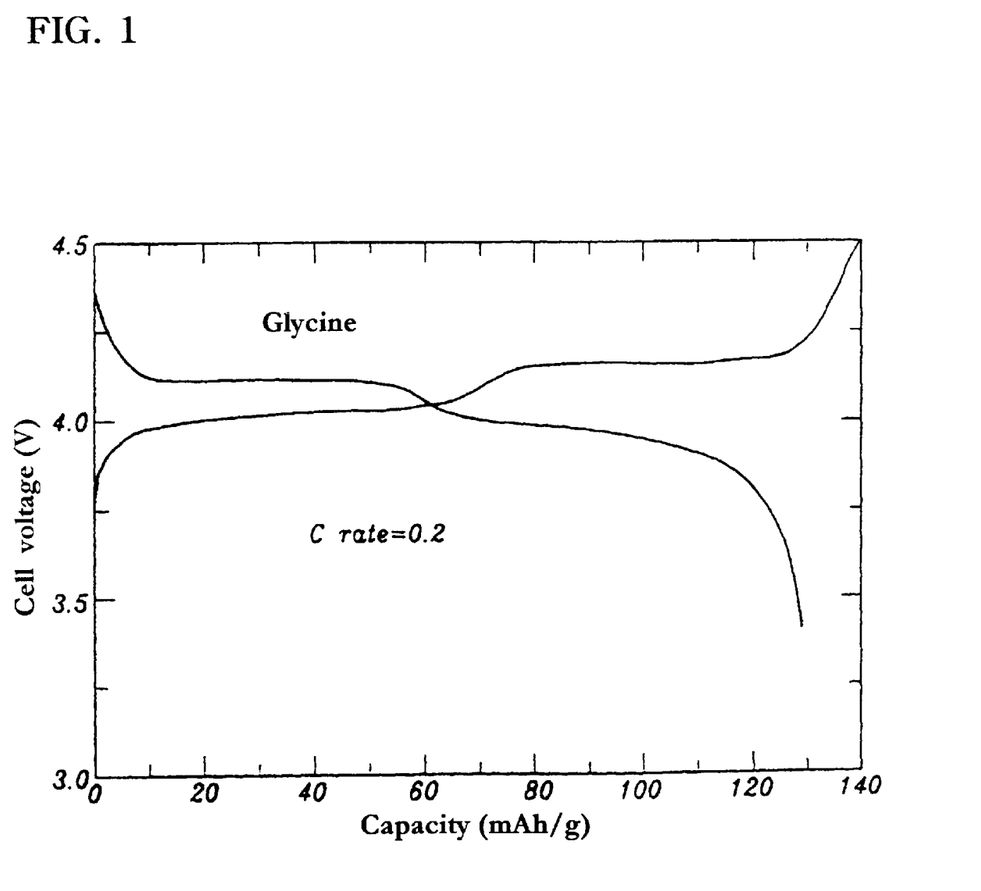
FIG. 1 is an initial charge-discharge curve of the cathode active material powder synthesized by using glycine as a chelating agent according to Example 1 of the present invention.

1.05 mole of $LiOH.H_2O$, 2 mole of manganese acetate $[(CH_3CO_2)_3Mn.4H_2O]$ and glycine were added to 80 ml of distilled water at a temperature of 80° C. and completely dissolved. An amount of glycine equal to the weight of 1.5 mol of manganese acetate was used. Then, the distilled water was nearly evaporated, and the temperature was raised at a rate of about 5 to about 200° C./min, and heat treatment at a temperature ranging from 300 to 400° C. was performed. As the heat treatment progressed, foam was formed in the solution and black $LiMn_2O_4$ powder suddenly started to deposit. After the reaction was completely finished, the powder was grounded and sintered at a temperature of 800° C. for at least 4 hours. The temperature was raised to 800° C. at a rate of about 1 to about 2° C./min. After sintering, the powder was cooled to room temperature at a rate of about 1 to about 2° C./min. The surface area was measured using BET after the powder was lightly ground using mortar and pestle. The surface area was 5.2 $m^2/g$, and the initial capacity according to the charge-discharge experiment at 0.2 C was 131 mAh/g as shown in FIG. 1.

EXAMPLE 2

Figure 2:
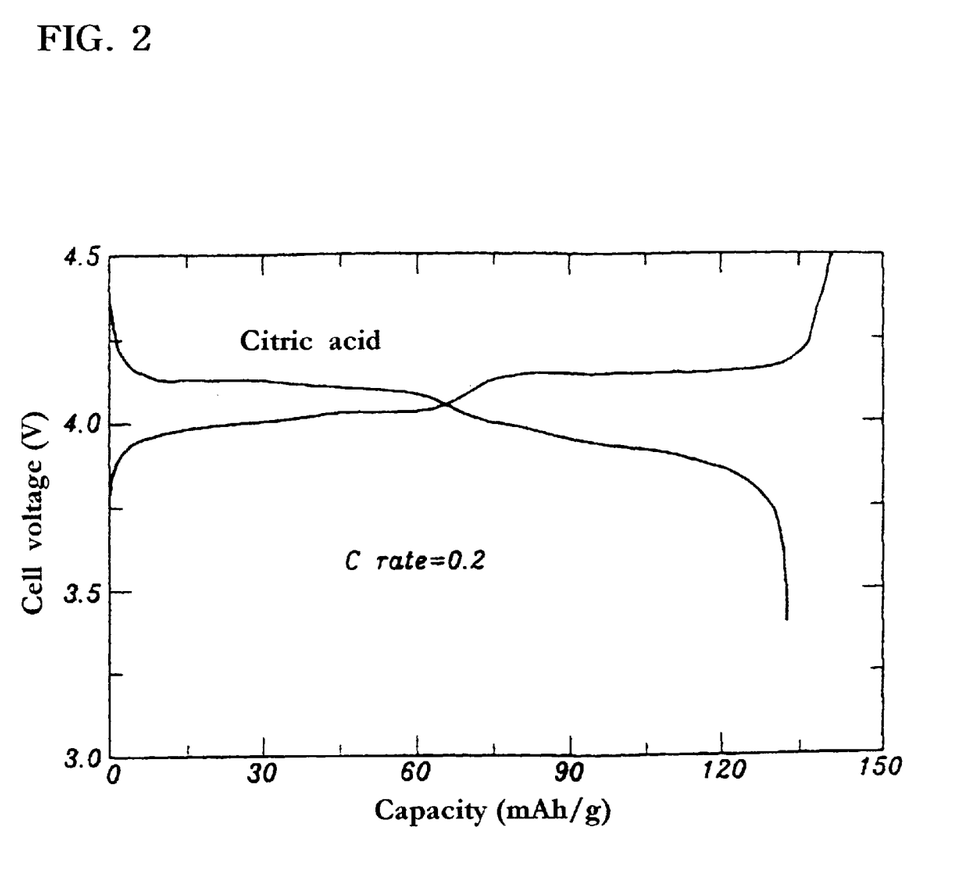
FIG. 2 is an initial charge-discharge curve of the cathode active material powder synthesized by using citric acid as a chelating agent according to Example 2 of the present invention.

1 mole of $LiOH.H_2O$ and 2 mole of manganese acetate were dissolved in about 50 to about 80 ml of distilled water until the solution showed a brown color. Then, 1 mole/l of citric acid was added so that the brown color was changed to pink and the starting materials were completely dissolved. This solution was slowly evaporated at a temperature of about 80 to about 100° C. so that the solution was changed to a gel state. After the distilled water was nearly evaporated, the temperature was raised at a rate of about 5 to about 20° C./min, and heat treatment was performed at a temperature ranging from 300 to 400° C. As the heat treatment progressed, foam was formed, and black $LiMn_2O_4$ powder suddenly started to deposit. After the reaction was completely finished, the powder was grounded, the temperature was raised at a rate of about 1 to about 2° C./min, and the powder was sintered at a temperature of 800° C. for 6 hours. After sintering, the powder was cooled at a rate of about 1 to about 2° C./min to room temperature. The surface area was measured using BET after the powder was lightly ground using mortar and pestle. The surface area was 5.1 $m^2/g$, and the initial capacity according to the charge-discharge experiment at 0.2 C was 130 mAh/g as shown in FIG. 2.

EXAMPLE 3

Figure 3:
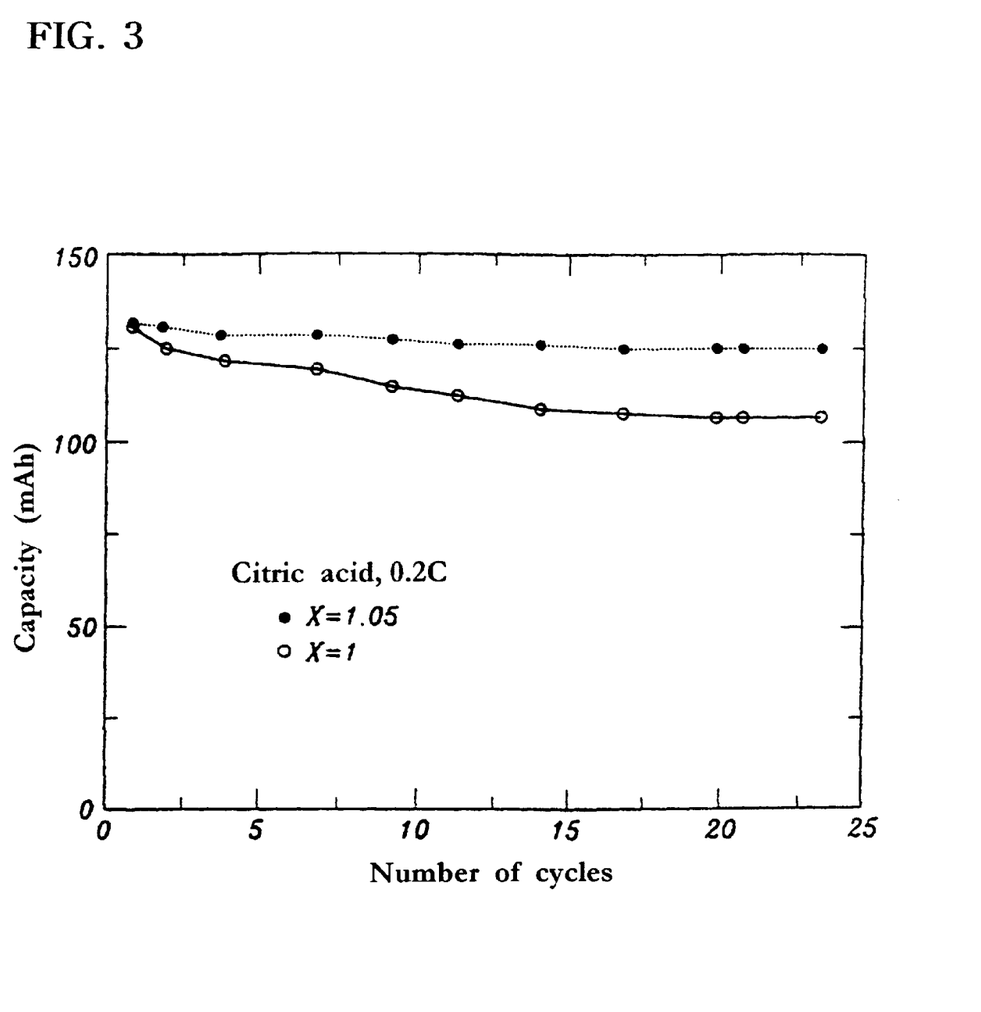
FIG. 3 is a graph showing the capacity changes of $LiMn_2O_4$ powder prepared by the method according to Example 2 and $Li_{1.05}Mn_2O_4$ powder prepared by the method according to Example 3.

$Li_{1.05}Mn_2O_4$ powder was prepared by the same procedure as in Example 2 except that 1.05 moles of $LiOH.H_2O$ and 2 moles of manganese acetate were used. As shown in FIG. 3, when the manganese to lithium molar ratio was 2:1 (see Example 2), the capacity was largely reduced after 22 cycles compared to the capacity when the manganese to lithium molar ratio was 2:1.05 (see Example 3).

EXAMPLE 4

Figure 4:
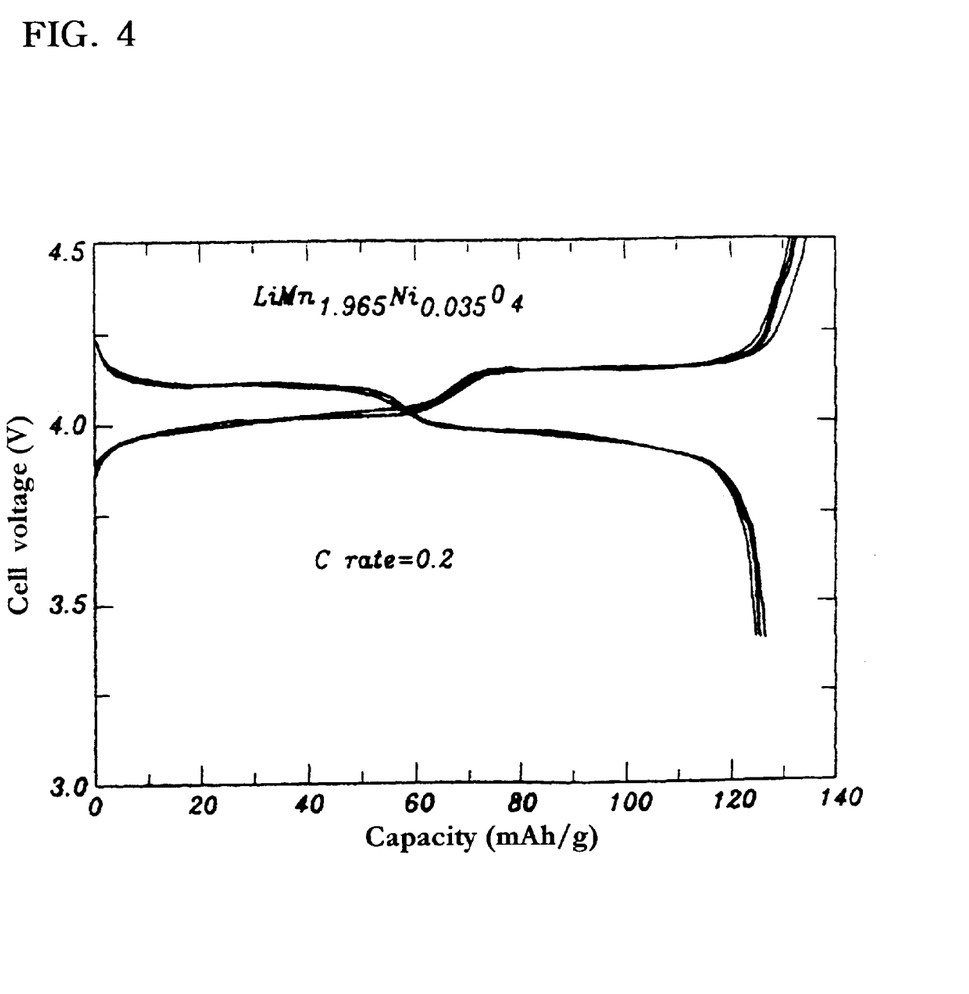
FIG. 4 is a charge-discharge curve of $LiMn_{1.955}Ni0_{0.35}O_4$ powder prepared by Example 4 of the present invention.

1 mole of $LiOH.H_2O$, 1.965 mole of manganese acetate and 0.035 mol of nickel acetate were dissolved in distilled water. After evaporating the distilled water to some extent, 1 mole/l of citric acid was added. Then the temperature was raised at a rate of about 5 to about 20° C./min, and heat treatment was performed at a temperature ranging from 300 to 400° C. Then, $LiMn_{1.965}Ni_{0.035}O_2$ powder was suddenly deposited, and, after the reaction was completely finished, the powder was ground, the temperature was raised at a rate of about 1 to about 2° C./min, and the powder was sintered at a temperature of 800° C. for at least 4 hours. After sintering, the powder was cooled to room temperature at a rate of about 1 to about 2° C./min. Then the powder was ground lightly with mortar and pestle. The initial capacity according to the charge-discharge experiment at 0.2 C was 124 mAh/g, but the capacity after 22 cycles was maintained at 95% of its initial value, as shown in FIG. 4.

EXAMPLE 5

1 mole of $LiOH.H_2O$, 1.965 mole of manganese acetate and 0.035 mol of cobalt acetate were dissolved in distilled water. After evaporating the distilled water to some extent, 1 mole/l of citric acid was added. Then the temperature was raised at a rate of about 5 to about 20° C./min, and heat treatment was performed at a temperature ranging from 300 to 400° C. Then, $LiMn_{1.965}Ni_{0.035}O_2$ powder was suddenly deposited, and, after the reaction was completely finished, the powder was ground, the temperature was raised at a rate of about 1 to about 2° C./min, and the powder was sintered at a temperature of 800° C. for at least 4 hours. After sintering, the powder was cooled to room temperature at a rate of about 1 to about 2° C./min.

EXAMPLE 6

1 mole of $LiOH.H_2O$, 1.965 mole of manganese acetate and 0.035 mol of tin acetate were dissolved in distilled water. After evaporating the distilled water to some extent, 1 mole/l of citric acid was added. Then the temperature was raised at a rate of about 5 to about 20° C./min, and heat treatment was performed at a temperature ranging from 300 to 400° C. Then $LiMn_{1.965}Sn_{0.035}O_2$ powder suddenly deposited, and, after the reaction was completely finished, the powder was ground, the temperature was raised at a rate of about 1 to about 2° C./min, and the powder was sintered at a temperature of 800° C. for at least 4 hours. After sintering, the powder was cooled to room temperature at a rate of about 1 to about 2° C./min.

EXAMPLE 7

Figure 5:
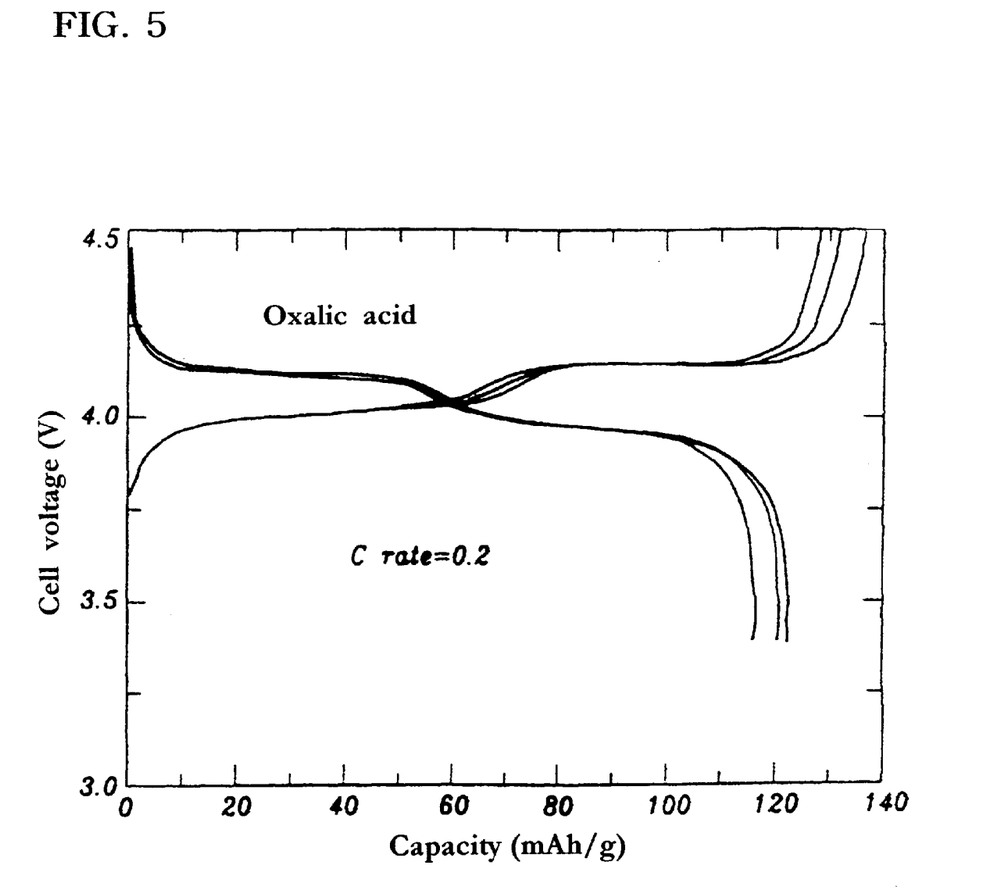
FIG. 5 is a charge-discharge curve of a cathode active material powder synthesized by using oxalic acid as a chelating agent according to Example 7 of the present invention.
Figure 6:
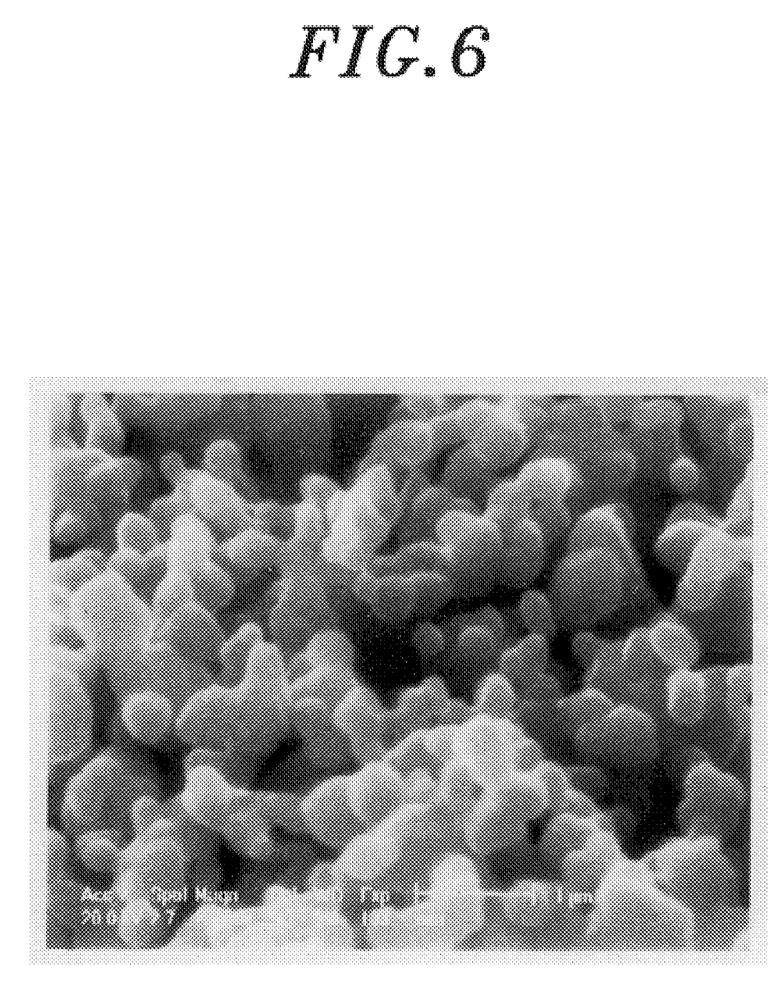
FIG. 6 is a Scanning Electron Micrograph of a cathode active material powder synthesized by using citric acid as a chelating agent according to Example 2 of the present invention.

The same procedure as in Example 1 was performed except that 1 mole/l of oxalic acid was used as the chelating agent. The initial capacity according to the charge-discharge experiment at 0.2 C was 120 mAh/g as shown in FIG. 5.

Comparative Example

According to A. Momchilov [*J. Power Sources*, 41 (1993), p305], it is reported that $LiMn_2O_4$ formed at a temperature less than 550° C. has a twisted spinel phase. Therefore, $LiMn_2O_4$ powder made by combusting the powder at 400° C. has a twisted spinel phase, and after heat treatment at 800° C., the $LiMn_2O_4$ powder has an ordered spinel phase.

Also, if the powder is heat-treated at 400° C. for 48 hours, and then sintered at 700° C. for 160 hours, the initial capacity (0.2 C charge-discharge) of the powder is 100 mAh/g, which is relatively low compared to that of powder prepared at 800° C.

BET surface areas and initial capacities (0.2 C charge-discharge) of the powders synthesized by the method described in Examples 1 to 7 and the Comparative Example are shown in Table 1.

TABLE 1

| | BET Surface Area $(m^2/g)$ | capacity (mAh/g) (during 0.2C charge-discharge) |
|---|---|---|
| Example 1 | 5.2 | 131 |
| Example 2 | 5.1 | 130 |
| Example 3 | 5.1 | 122 |
| Example 4 | 4.8 | 124 |
| Example 5 | 4.8 | 123 |
| Example 6 | 4.7 | 122 |
| Example 7 | 4.2 | 120 |
| Comparative Example | 1.4 | 110 |

As shown above in Table 1, a cathode active material powder having high capacity and BET surface area measured by BET of more than 3 $m^2/g$ can be prepared according to the present invention.

In the present invention, due to the fully dissolved manganese acetate, the combusting reaction is performed homogeneously, and $Li_xMn_yO_4$ having a perfect twisted spinel phase can be synthesized. Thus, synthesis time at 800° C. is reduced by more than 70%. Also, by adding a small quantity of citric acid into the solution of lithium hydroxide and manganese acetate, the same effect can be obtained, and powder having high capacity can be easily synthesized compared to the method of U.S. Pat. No. 5,135,732.

In this disclosure, there are shown and described only preferred embodiments of the invention, but, as aforementioned, it is to be understood that the invention is capable of use in various other combinations and environments and is capable of changes and modifications within the scope of the inventive concepts expressed herein.

What is claimed is:

1. Amended) A process for preparing an active material for a cathode of a lithium ion battery comprising the steps of:

dissolving lithium hydroxide and manganese acetate as starting materials into water to form a solution;

adding glycine into the solution;

evaporating the solution to produce a gel or liquid phase; and raising the temperature at a rate of 5 to 20° C./min, and combusting and calcinating the gel or liquid phase at 300 to 400° C. for 2 to 3 hours to produce a powder.

2. The process for preparing an active material for a cathode of a lithium ion battery of claim 1, further comprising the steps of sintering the powder at 700–850° C. for 4 to 6 hours and slowly cooling the powder to room temperature at a rate of 0.1 to 2° C./min after the step of combusting and calcinating.

3. The process for preparing an active material for a cathode of a lithium ion battery of claim 1, wherein the amount of the lithium hydroxide is in the range of 0.95 mole to 1.07 mole, the amount of the manganese acetate is in the range of 1.93 mole to 2.05 mole, and the amount of the glycine is in the range of 0.5 mole to 1 mole.

4. The process for preparing an active material for a cathode of a lithium ion battery of claim 1, wherein the cathode active material for a lithium ion battery is $Li_xMn_yO_4$ powder, wherein x is within the range of 0.95 to 1.07 and y is within the range of 1.95 to 2.05.

5. The process for preparing an active material for a cathode of a lithium ion battery of claim 1, wherein the starting materials further comprises a stabilizer.

6. The process for preparing an active material for a cathode of a lithium ion battery of claim 6, wherein the amount of the lithium hydroxide is in the range of 0.95 mole to 1.07 mole, the amount of the manganese acetate is in the range of 1.93 mole to 2.05 mole, and the amount of the glycine is in the range of 0.5 mole to 1 mole, and the amount of the stabilizer is in the range of 0.01 mole to 0.05 mole.

7. The process for preparing an active material for a cathode of a lithium ion battery of claim 5, wherein the stabilizer is selected from the group consisting of nickel acetate, cobalt acetate and tin acetate.

8. The process for preparing an active material for a cathode of a lithium ion battery of claim 5, wherein the cathode active material for a lithium ion battery is $Li_xMn_{2-y}M_yO_4$ powder, wherein x is within the range of 1 to 1.07 and y is within the range of 0 to 0.05.

* * * * *